United States Patent [19]

Goswick

[11] Patent Number: 5,570,619
[45] Date of Patent: Nov. 5, 1996

[54] SLACK ADJUSTER ARM WRENCH

[76] Inventor: Leroy Goswick, P.O. Box 856, Racine, Mo. 64858

[21] Appl. No.: 515,657

[22] Filed: Aug. 16, 1995

[51] Int. Cl.⁶ .................................................. B25B 11/00
[52] U.S. Cl. .............................................. 81/484; 81/488
[58] Field of Search ................................. 81/177.2, 461, 81/484, 488

[56] References Cited

U.S. PATENT DOCUMENTS

| | | |
|---|---|---|
| 684,426 | 10/1901 | Harvey et al. |
| 1,585,858 | 5/1926 | Hiatt. |
| 1,810,513 | 6/1931 | Zimmerman. |
| 2,511,175 | 6/1950 | Pearson. |
| 2,618,183 | 11/1952 | Cooke. |
| 2,681,791 | 6/1954 | Hahn. |
| 3,602,342 | 8/1971 | Whittle. |
| 3,891,185 | 6/1975 | Lett. |
| 4,244,559 | 1/1981 | Mote. |
| 4,587,870 | 5/1986 | Colburn. |
| 4,750,252 | 6/1988 | Homeyer. |
| 4,768,408 | 9/1988 | Boudjack. |
| 5,009,135 | 4/1991 | Arnold. |

*Primary Examiner*—James G. Smith
*Attorney, Agent, or Firm*—Hovey, Williams, Timmons & Collins

[57] ABSTRACT

A slack adjuster arm wrench is provided for engaging the slack adjuster arm of a brake. The slack adjuster arm wrench hereof includes an elongated lever and first and second generally parallel engagement members connect to and extending substantially normally from the lever. A plate connects the engagement members to provide reinforcement during use. The engagement members are preferably circular in cross-section and may be of different diameters to facilitate use with holes in various slack adjuster arms.

8 Claims, 1 Drawing Sheet

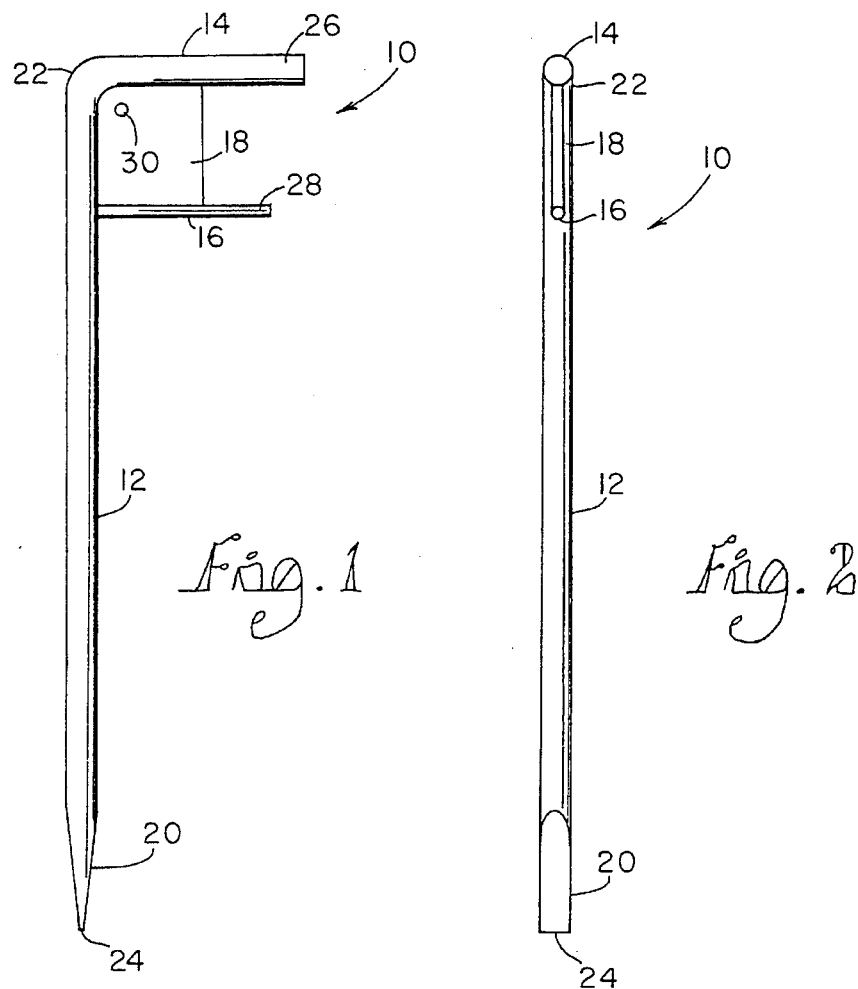
Fig. 1
Fig. 2
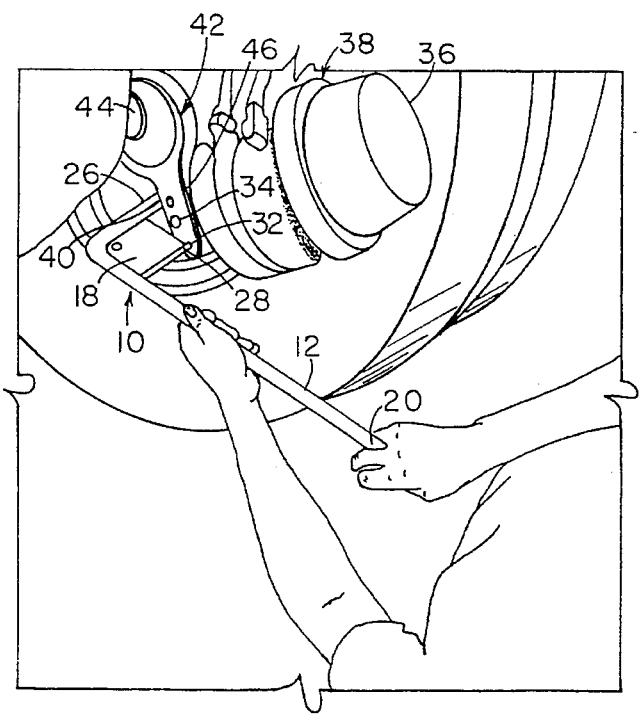
Fig. 3

SLACK ADJUSTER ARM WRENCH

BACKGROUND OF THE INVENTION

1. Field of the Invention

A slack adjuster arm wrench is provided for manipulating the slack adjuster of an air brake or the like. The slack adjuster arm wrench hereof includes an elongated lever and a pair of engagement members interconnected by a plate for insertion into a complimentary opening in the slack adjuster arm.

2. Description of the Prior Art

Air brakes arm commonly employed in larger trucks and in railway applications. Typically, these air brakes include an arm which adjusts the amount of slack before the air brakes engage. That is to say, the air brakes include a degree of slack which accommodates some leeway between the point at which the operator begins depressing the brake pedal and the time when the air brakes begin to engage.

The amount of slack is a closely monitored safety criteria. State officials responsible for monitoring the safe operation of trucks routinely check the amount of slack in the air brakes because excessive slack may delay the stopping distance and result in an increased incidence of accidents for such trucks. Unfortunately, the adjustment in the amount of slack in the air brakes is a matter routinely neglected or avoided by truck operators. One principal reason for this unfortunate circumstance is the difficulty in gaining access to the slack adjuster arm in manipulating it to provide the desired amount of slack—about ¾". The location and orientation of the slack adjuster arm which is typically under the truck and inboard of the wheel, is difficult to reach.

In the past, most individuals seeking to adjust the slack in an air brake utilized a screw driver or a straight bar to pivot the slack adjuster arm. This requires the user to attempt to pry the slack adjuster arm against some other brake component. Other approaches to slack adjustment in air brakes are shown generally in U.S. Pat. Nos. 2,681,791 to Hahn and 5,009,135.

There has, however, developed a need for a simple, economical tool which will enable the operator to pivot the slack adjuster arm to provide the desired amount of slack in an air brake which provides superior leverage, easier access, accommodates different slack adjuster arms and engages only the slack adjuster arm itself, requiring no prying action against other brake components.

SUMMARY OF THE INVENTION

These problems have in large measure been solved by the slack adjuster arm wrench of the present invention. That is to say, the slack adjuster arm wrench hereof is inexpensive to manufacture, strong and resistant to abuse, accommodates differently configured slack adjuster arms, and provides improved leverage and access for the user without the necessity of prying against other brake or truck components.

Broadly speaking, the slack adjuster arm wrench hereof involves a simple yet highly function tool which is particularly configured for the present field of use. It includes an elongated lever and pair of engagement members which are connected to the lever and oriented substantially normally thereto. The two engagement members are thus substantially parallel, and preferably circular in cross-section. A gusset plate is located between the engagement members and preferably is further connected to the lever arm to provide increased rigidity.

In especially preferred embodiments, one of the engagement members may be provided by bending the lever adjacent one end thereof, with the second engagement member being not only shorter in length, but also of reduced cross-section relative to the first engagement member. This latter aspect allows the slack adjuster arm wrench hereof to interfit into differently sized openings in a slack adjuster arm corresponding to either the larger or smaller of the engagement members. The gusset plate is located to leave one of the outermost portions of the first and second engagement members free for insertion into an opening in the slack adjuster arm with which the wrench hereof is used. The gusset plate is preferably provided with a hole therein for easy storing of the wrench when not in use. Finally, the end of the lever opposite the first engagement member is preferably bevelled so that the wrench hereof can be used for prying into narrow openings when necessary to begin the pivoting movement of the slack adjuster arm.

BRIEF DESCRIPTION OF THE DRAWINGS

FIG. 1 is a front elevational view of the slack adjuster arm hereof;

FIG. 2 is a right side elevational view thereof; and

FIG. 3 is a perspective view showing use of the slack adjuster arm wrench hereof on the slack adjuster arm of an air brake.

DESCRIPTION OF THE PREFERRED EMBODIMENT

Referring now to the drawing, FIGS. 1 and 2 illustrate the slack adjuster arm wrench 10 in accordance with the preferred embodiment of the present invention. Wrench 10 broadly includes elongated lever 12, first engagement member or reach 14, second engagement member or pin 16 and gusset plate 18. Lever 12 and reach 14 are preferably formed integrally of a single steel bar, with pin 16 and gusset plate 18 being also of steel and welded to the lever 12.

Lever 12 is provided with a proximate end 20 and a distal end 22 which is shaped into a bend and continues into reach 14. Proximate end 20 is bevelled to edge 24. Reach 14 extends substantially normally to elongated lever 12 and is provided with an engagement portion 26 at the remote or outboard end of reach 14. Similarly, pin 16 extends substantially normally to lever 12 and is oriented generally parallel to reach 14. Pin 16 is provided with an abutment portion 28 at the outboard or remote end thereof relative to lever 12.

Gusset plate 18 is welded to and extends between reach 14 and pin 16, and is further welded to lever 12 to provide a rigid reinforcement therebetween. Engagement portion 26 extends generally laterally a further distance from lever 12 than does abutment portion 28 of pin 16. However, gusset plate 18 does not extend laterally as far as engagement portion 26 or abutment portion 28, but rather lies relatively inboard or more proximate to lever 12. Pin 16 is preferably circular in cross-section as is reach 14, with abutment portion 28 being of reduced diameter compared to engagement portion 26, so that either engagement portion 26 or abutment portion 28 may be complimentarily sized to fit within an opening in a slack adjuster arm. Gusset plate 18 is preferably provided with a hole 30 to receive a hanger or other device so that the slack adjuster arm wrench 10 hereof may be hung out of the way when not in use.

FIG. 3 illustrates the slack adjuster arm wrench 10 hereof in use. As may be seen, most slack adjuster arms are typically provided with one or more openings 32 and 34 therein. These openings typically receive rods or other devices connecting the slack adjuster arm to the internal components contained within a housing 36 of an air brake 38 of a vehicle such as a truck or the like. Typically, one or more of these openings is not occupied by the rod and may thus receive either the engagement portion 26 or the abutment portion 28 of the wrench 10 hereof therethrough. Because pin 16 and reach 14 are of different diameters, they may be received complimentarily into differently sized openings.

In order to adjust the amount of slack in the air brake 38, the user need only place one of either engagement portion 26 or abutment portion 28 into an opening 32 or 34 and the other of the abutment portion or engagement portion on the exterior edge 40 of a slack adjustment arm 42 by exerting force at the proximate end 20 of the lever 12 the slack adjustment arm 42 may be pivoted abut its shaft 44. The elongated lever 12 enables the user to employ a substantial mechanical advantage for pivoting the slack adjustment arm 42 about its shaft 44. As may be seen in FIG. 3, the wrench 10 hereof may be relocated to place engagement portion 26 against opposite edge 46 of the slack adjustment arm 42 should adjustment in the opposite direction be desired. The slack adjuster arm wrench 10 hereof is especially configured for use with slack adjuster arms and thus may be quickly and easily removed, making adjustments to the slack of the air brake 38 relatively easy.

It is to be understood that various modifications can be made to the wrench hereof and still fall within the spirit of the present invention. For example, either engagement portion 26 or abutment portion 28 could be tapered to facilitate insertion into the desired opening 32 or 34 and to accommodate a further range of openings.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the liberal scope of the invention as set out in the following claims.

I claim:

1. A tool for adjusting the slack adjuster arm of an air brake comprising:
    an elongated lever adapted for grasping by a user presenting first and second ends;
    a first engagement member connected to said lever and said first end and extending substantially normal thereto, said first engagement member presenting an engagement portion remote from said lever;
    a second engagement member connected to said lever in spaced relationship to said first engagement member and extending substantially normal to said lever and substantially parallel to said first engagement member, said second engagement member presenting an abutment portion remote from said lever; and
    a plate interconnecting said first engagement member and said second engagement member inboard of said engagement portion and said abutment portion.

2. A tool as set forth in claim 1, wherein said first engagement member is integrally formed with said lever by bending the latter.

3. A tool as set forth in claim 1, wherein said first engagement member comprises a bar which is substantially circular in cross-section.

4. A tool as set forth in claim 3, wherein said second engagement member comprises a pin which is substantially circular in cross-section.

5. A tool as set forth in claim 4, wherein said first engagement member and said second engagement member each presenting different diameters.

6. A tool as set forth in claim 1, wherein said first engagement member extends outwardly from said lever a greater distance than said second engagement member.

7. A tool as set forth in claim 1, wherein said plate defines an opening therein.

8. A tool as set forth in claim 1, wherein said plate is further connected to said lever.

* * * * *